(12) United States Patent
Downs (10) Patent No.: US 9,340,141 B1
(45) Date of Patent: May 17, 2016

(54) WATERCRAFT TRAILER AND LATCHING MECHANISM FOR SAME AND RELATED METHOD

(71) Applicant: Joseph C. Downs, Lexington, KY (US)

(72) Inventor: Joseph C. Downs, Lexington, KY (US)

( * ) Notice: Subject to any disclaimer, the term of this patent is extended or adjusted under 35 U.S.C. 154(b) by 0 days.

(21) Appl. No.: 13/795,863

(22) Filed: Mar. 12, 2013

Related U.S. Application Data (60) Provisional application No. 61/667,012, filed on Jul. 2, 2012.

(51) Int. Cl.
*B60P 3/10* (2006.01)

(52) U.S. Cl.
CPC ..................................... *B60P 3/1066* (2013.01)

(58) Field of Classification Search
CPC ....................................................... B60P 3/1066
USPC ....... 280/414.1, DIG. 51, 194, 195, 198, 216, 280/219, 220, 226, 433, 434, 43, 6, 437, 280/229, 340, 436; 410/77
See application file for complete search history.

(56) References Cited

U.S. PATENT DOCUMENTS

| | | | | |
|---|---|---|---|---|
| 2,491,373 A * | 12/1949 | Goff | .......................... | B60D 1/04 280/508 |
| 3,512,804 A * | 5/1970 | Siegert | ..................... | B60D 1/04 280/460.1 |
| 3,963,263 A | 6/1976 | Whitlock | | |
| 4,919,446 A | 4/1990 | Higgins | | |
| 4,927,196 A * | 5/1990 | Girard | ..................... | E05B 81/20 292/201 |
| 4,979,384 A * | 12/1990 | Malesko | ................. | E05B 81/14 292/201 |
| 5,120,079 A | 6/1992 | Boggs | | |
| 5,193,835 A | 3/1993 | Sheets | | |
| 5,599,035 A | 2/1997 | Spence | | |
| 5,683,214 A | 11/1997 | Jeffreys | | |
| 5,876,166 A | 3/1999 | Hyslop | | |
| 6,598,896 B1 * | 7/2003 | Hyslop | ..................... | B60P 3/10 280/414.1 |
| 2003/0121675 A1 * | 7/2003 | Gingerich | ............ | A01B 59/006 172/274 |
| 2009/0235767 A1 * | 9/2009 | Garneau | ............. | E05B 47/0012 74/56 |

* cited by examiner

*Primary Examiner* — Joseph Rocca
*Assistant Examiner* — Felicia L Brittman
(74) *Attorney, Agent, or Firm* — King & Schickli, PLLC (57) ABSTRACT

A watercraft trailer having a latching mechanism for receiving a watercraft connection member in order to secure the watercraft on the trailer is provided. The latching mechanism includes a main body having a channel for receiving the watercraft connection member in a receiving position, a latching member supported by the main body for rotational movement between the receiving position and a secured position, a plunger supported by the main body and biased generally toward the latching member, a block biased generally away from the latching member and positioned between the latching member and the plunger for engaging the latching member in the secured position whereby engagement of the latching member by the watercraft connection member causes rotational movement of the latching member which secures the watercraft.

13 Claims, 8 Drawing Sheets

WATERCRAFT TRAILER AND LATCHING MECHANISM FOR SAME AND RELATED METHOD

This application claims the benefit of U.S. Provisional Patent Application No. 61/667,012, filed Jul. 2, 2012, the disclosure of which is incorporated herein by reference.

FIELD OF THE INVENTION

The present invention relates generally to mechanisms for securing watercraft on a trailer; and more particularly to a latching mechanism supported by a watercraft trailer that receives a U-bolt or the like typically affixed to the watercraft.

BACKGROUND OF THE INVENTION

Trailers for transporting, launching and retrieving watercraft including fishing, skiing, or pleasure boats or jet skis are widely used by the public. While a variety of different winch and tow rope arrangements have been and may be employed to assist in securing the watercraft to the trailer, one commonly used element of such arrangements is a generally U-shaped bolt or eyelet of some configuration which is affixed to the bow of the watercraft. Typically, such a bolt is positioned on the centerline of the watercraft which provides consistency from one type and/or size of watercraft to the next.

Over the years there have been several attempts to minimize the reliance on ropes and winches and to simplify the loading and unloading of watercraft from trailers. In evaluating these trailer designs it is important to note that simplicity of operation is important but so too is the reliability of the latching mechanism. The latching mechanism should operate in at least a semi-automatic manner, be suitable for use with a wide variety of watercraft including differing sizes and shapes, securely anchor the watercraft to the trailer regardless of external conditions, and be manufactured to withstand potentially repeated contact from the watercraft during loading and unloading.

Accordingly, a need exists for a latching mechanism capable of receiving the U-shaped bolt of a watercraft and automatically securing the watercraft on the trailer. In addition, the latching mechanism should be able to release the watercraft U-shaped bolt during unloading with or without the need for human intervention. Each of these features should be available in a device that can withstand contact from the watercraft during the loading and unloading processes. All of these features are provided by the following invention. Naturally, any improvements along such lines should contemplate good engineering practices, such as simplicity, ease of implementation, unobtrusiveness, stability, etc.

SUMMARY OF THE INVENTION

The present invention meets these needs by providing a latching mechanism for use in association with a watercraft trailer for receiving a watercraft connection member (e.g., a U-shaped bolt, bow ring, or the like) in order to secure the watercraft on the trailer. According to one aspect of the invention, the latching mechanism includes a main body having a channel for receiving the watercraft connection member in a receiving position, a latching member supported by the main body for rotational movement between the receiving position and a secured position, a plunger supported by the main body and biased generally toward the latching member, a block biased generally away from the latching member and positioned between the latching member and the plunger for engaging the latching member in the secured position whereby engagement of the latching member by the watercraft connection member causes rotational movement of the latching member which secures the watercraft.

In another aspect of the invention, the latching member is biased to the receiving position and includes a notch for receiving the block in the secured position. In this manner, the block engages at least a wall of the notch in the secured position to prevent rotation of the latching member back to the biased receiving position when the watercraft is secured on the trailer.

In yet another aspect of the invention, the latching mechanism further includes a handle for retracting the plunger in the secure position thereby allowing the latching member to rotate back to the open position when the watercraft is placed in water. Even more, the handle is rotationally connected to the plunger and acts as a cam when rotated thereby moving the plunger from a first position wherein the plunger engages the block and a second position wherein the plunger is disengaged from the block.

Yet another aspect of the invention includes a trailer for a watercraft including a frame for supporting the watercraft, at least two wheels supporting the frame, and a latching mechanism for receiving a watercraft connection member in order to secure the watercraft on the trailer. The latching mechanism includes a main body having a channel for receiving the watercraft connection member in a receiving position, a latching member supported by the main body for rotational movement between the receiving position and a secured position, and a plunger supported by the main body and biased generally toward the latching member for engaging the latching member in the secured position. In this manner, engagement of the latching member by the watercraft connection member causes rotational movement of the latching member which secures the watercraft.

In another aspect of the invention, the latching mechanism of the trailer further includes a handle for retracting the plunger in the secure position thereby allowing the latching member to rotate back to the open position when the watercraft is placed in water. Even more, the handle is rotationally connected to the plunger and acts as a cam when rotated thereby moving the plunger from a first position wherein the plunger engages the latching member and a second position wherein the plunger is disengaged from the latching member.

In still another aspect of the invention, the latching mechanism includes a block biased generally away from the latching member and positioned between the latching member and the plunger. In this embodiment, the plunger engages the block which in turn engages the latching member in the secured position. Even more, the handle in this embodiment is rotationally connected to the plunger and acts as a cam when rotated thereby moving the plunger from a first position wherein the plunger engages the block and a second position wherein the plunger is disengaged from the block.

In still yet another aspect of the invention, the latching mechanism includes a main body having a channel for receiving the watercraft connection member in a receiving position, a latching member supported by the main body for rotational movement between the receiving position and a secured position, and a plunger supported by the main body and biased generally toward the latching member for engaging the latching member in the secured position. In this manner, engagement of the latching member by the watercraft connection member causes rotational movement of the latching member allowing the plunger to secure the latching member in the secured position which secures the watercraft.

In another aspect of the invention, the latching member includes a notch for receiving the plunger which extends at least partially into and engages the notch in the secured position to prevent rotation of the latching member back to the receiving position when the watercraft is secured on the trailer. The latching mechanism further includes a cover to limit contact with external elements. The cover may be a molded material and designed to essentially fit around the main body of the latching mechanism. The latching mechanism further includes a handle for retracting the plunger in the secure position thereby allowing the latching member to rotate when the watercraft is placed in water. Even more, the handle is rotationally connected to the plunger and acts as a cam when rotated thereby moving the plunger from a first position wherein the plunger extends into the latching member and a second position wherein the plunger is withdrawn from the latching member allowing the bias of the latching member to rotate the latching member from the secure provision to the receiving position.

In accordance with another aspect of the invention, a method of securing a watercraft having a connection member on a trailer during loading of the watercraft onto the trailer includes the steps of providing a latching mechanism having a latching member rotationally biased to a receiving position and a plunger biased generally toward said latching member, the latching member having a notch for receiving said plunger in a secured position, moving the watercraft toward the latching mechanism until the watercraft connection member engages the latching member and moves the latching member from the receiving position to the secured position. The latching member may include a block biased away from the latching member and positioned between the latching member and the plunger so the plunger engages the block thereby forcing the block into the notch for securing the latching member in the secured position.

In yet another aspect of the invention, the method further includes the step of rotating a handle for retracting the plunger from the notch in the secure position thereby allowing the latching member to rotate to the receiving position and releasing the watercraft connection member and the watercraft.

Additional advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, mechanisms and related methods are hereinafter described for use in association with a watercraft trailer for receiving a watercraft connection member in order to secure the watercraft on the trailer.

Figure 1:
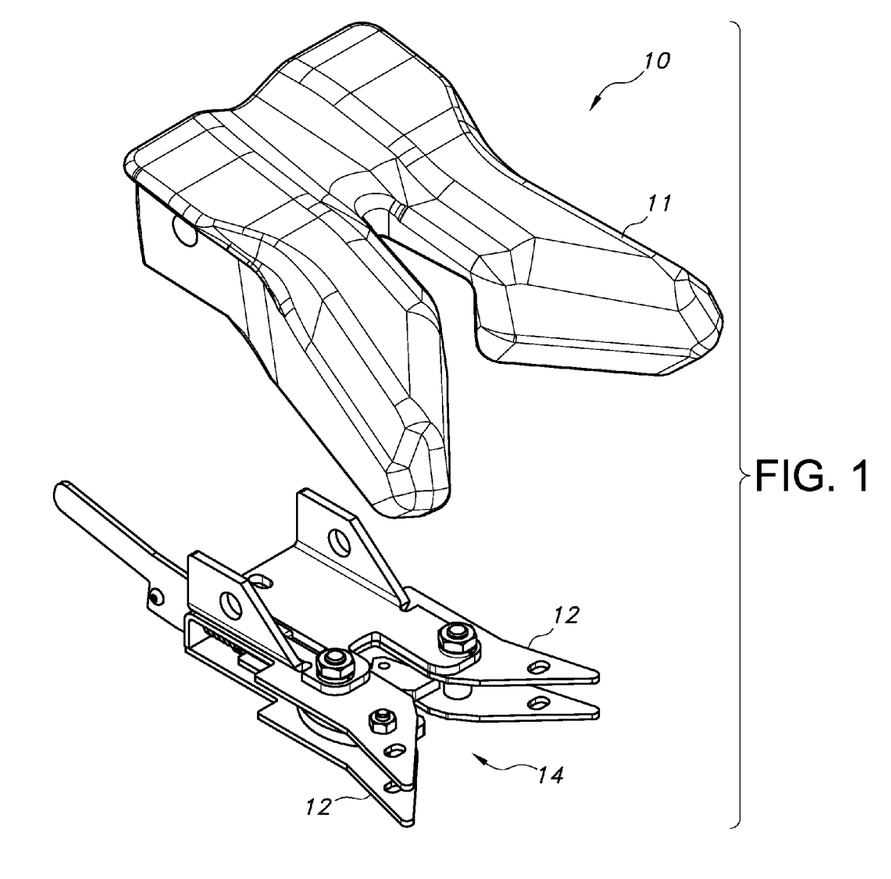
FIG. 1 is an exploding perspective view of a latching mechanism for use in association with a watercraft trailer for receiving a watercraft connection member in order to secure the watercraft on the trailer.

With reference to FIG. 1, there is shown an embodiment of a latching mechanism 10 for use in association with a watercraft trailer T (shown in FIG. 4) for receiving a watercraft connection member B (partially shown in phantom in FIG. 2), or bow ring, in order to secure the watercraft W (not shown) on the trailer. In accordance with the broad teaching of the invention, watercraft include boats, jet skis, and any other floating craft or submersible that is relies on a trailer when being removed from water.

The latching mechanism 10 includes a cover 11 and a main body 12 having a channel 14 for receiving the watercraft connection member B. The main body 12 of the latching mechanism 10 is preferably made of stainless steel in order to withstand the corrosive effects of water and provide sufficient strength to withstand being bumped or rammed by the watercraft during the loading and unloading processes. Of course, other metals and materials such as aluminum, titanium, and even carbon fiber can be used in accordance with the broad teaching of the present invention. The latching mechanism 10 may also include a cover 11 or housing to limit contact with external elements including environmental elements. The material used for the cover 11 should be resilient enough to withstand repeated contact with the watercraft connection member B and watercraft hull during loading and towing thereof. In the present embodiment, the cover 11 is made of urethane, which provides durability, flexibility, and is non-marring, and is designed to essentially fit around the main body 12 of the latching mechanism 10 like a glove fits around a hand. Alternatively, polyvinyl chloride (PVC), rubber, poly ethylene, and other plastics and moldable materials may be used to make the cover, and the cover could have a more standard shape so long as it is sufficient to cover the latching mechanism. Bolts or the like can be used to secure the cover to the main body 12.

Figure 2:
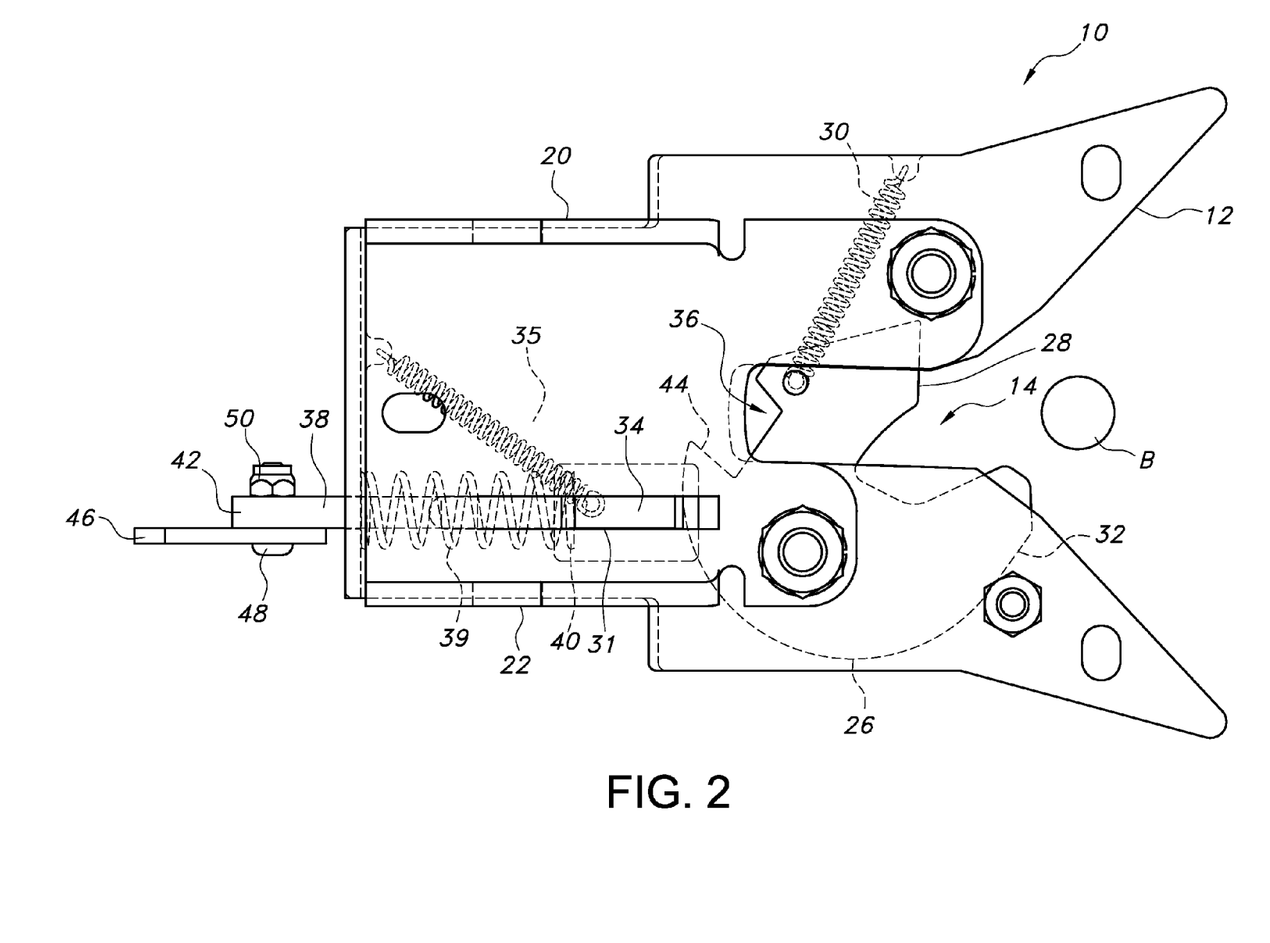
FIG. 2 is a top view of the latching mechanism.

As shown in FIG. 2, a latching member 26 is supported by the main body 12 for rotational movement between a receiving position and a secured position. More specifically, the latching member 26 is generally C-shaped and is biased such that a first leg 28 is positioned to engage the watercraft connection member B in the receiving position during loading of the watercraft W. The latching member 26 may be biased using various types of springs, spring arrangements, or the like and, in the preferred embodiment, a spring 30 connected between the latching member 26 and the main body 12 provides the noted bias. During loading of the watercraft W, the watercraft connection member B enters main body channel 14 and contacts the leg 28. The force exerted on the leg 28 by the watercraft connection member B is sufficient to overcome the bias and allow the latching member 26 to rotate counter-clockwise. A second leg 32 of the latching member 26 rotates across the channel 14 and blocks the watercraft connection member B from retreating from the channel. This secures the watercraft W in position.

At some point during rotation of the latching member 26, a block 34 is received by a notch 36 in the latching member. This holds the latching member 26 in the secured position. The block 34, also referred to as a floating block, is retained within a channel 31 of the main body 12 such that the block can travel linearly along a path defined by the channel, and into and out of the notch 36 in the latching member 26. The block 34 is biased generally away from the latching member 26 and is positioned between the latching member and a plunger 38. The block 34 may be biased using various types of springs, spring arrangements, or the like and, in the preferred embodiment, a spring 35 connected between the block and the main body 12 provides the noted bias.

The plunger 38 is likewise retained in the channel 31 such that the plunger can travel linearly along the same path as the block 34. In addition, the plunger 38 is biased generally toward the latching member 26. The plunger 38 may be biased using various types of springs, spring arrangements, or the like and, in the preferred embodiment, a spring 39 connected between the plunger and the main body 12 provides the noted bias. It should also be noted that the bias of the plunger 38 is greater than the bias of the block 34 in the present embodiment. In this manner, when the plunger 38 is retracted for releasing the watercraft W, the block 34 remains in the secure position until the watercraft connection member B contacts the latching member 26 causing further counter-clockwise rotation thereof which releases the biased block 34 from notch 36. In the secured position, the block 34 is held by a wall 44 of the notch 36 until the movement of the latching member 26 occurs. At that time, the bias of the block 34 causes the block to retract or recede from the notch 36 allowing the latching member 26 to rotate clockwise from the secure position back to its biased receiving position.

As best shown in FIG. 2, a first end 40 of the plunger 38 contacts the block 34 and a second end 42 extends beyond the main body 12. In the present embodiment, a handle 46 is attached to the plunger 38. More specifically, the handle 46 is rotationally connected to the plunger 38 using a bolt 48 and nut 50 and acts as a cam when rotated. This moves the plunger 38 from a first position wherein the plunger engages the block 34 to a second position wherein the plunger is disengaged from the block.

Figure 3:
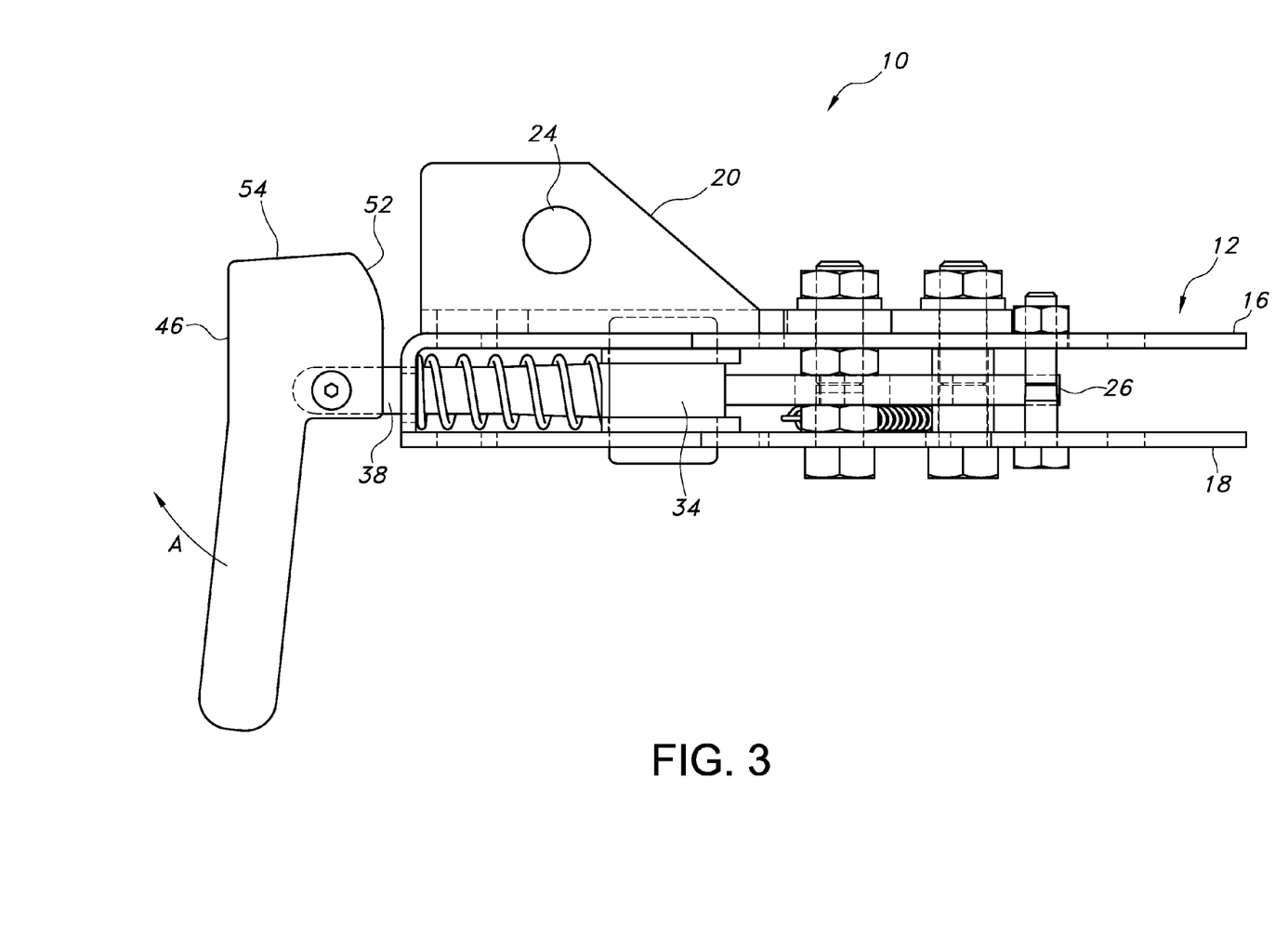
FIG. 3 is a cross-sectional view of the latching mechanism.

As shown in FIG. 3, the main body 12 in the present embodiment includes upper and lower plates 16, 18. Additional mounting plates 20 and 22 form part of the main body 12 and are welded to the upper plate 16. As will be described in greater detail below, mounting holes 24 are provided for mounting the main body 12 to the trailer T. In alternate embodiments, mounting plates 20 and 22 may be welded to the lower plate 18 providing mounting holes below the plates, or mounting plates may be welded to both the upper and lower plates providing mounting holes above and below the plates.

A cam surface 52 of the handle 46 is shown and the handle and plunger 38 are shown in FIG. 3 in the secured position wherein the watercraft W is held securely on the trailer T. When it is desired to unload the watercraft W, the handle 46 is rotated along cam surface 52, shown by action arrow A, until the handle comes to rest on side 54. In this position, the plunger 38 is retracted allowing the block 34 to engage or disengage the latching member 26 dependent upon the latching member being contacted by the watercraft connection member B as described above. In addition, the flat nature of the side 54 secures the handle 46 in position such that the plunger 38 remains retracted. In this manner, the watercraft W can be easily released from the latching mechanism 10 and allowed to float free of the trailer T.

Figure 4:
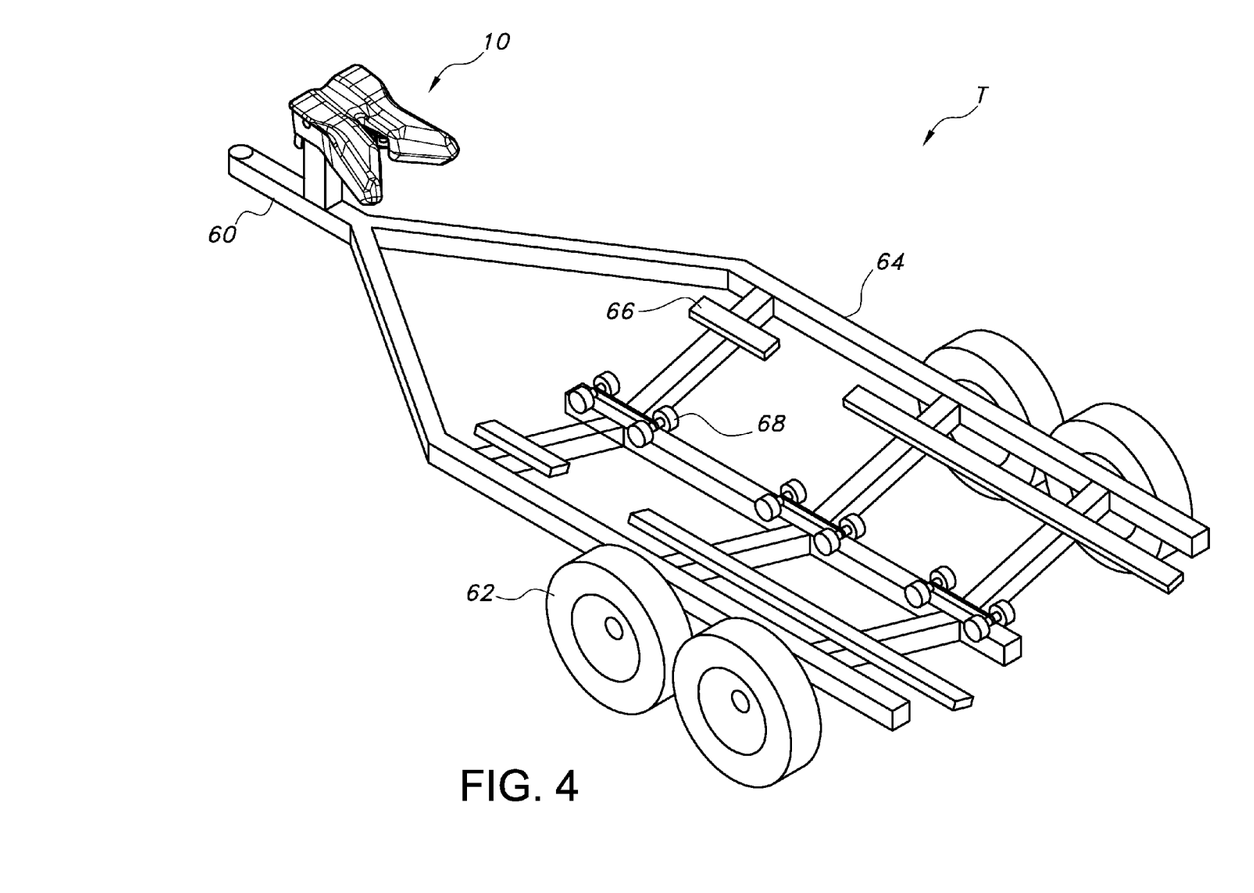
FIG. 4 is an isometric view of a conventional watercraft trailer on which the latching mechanism is mounted.

In another embodiment of the invention shown in FIG. 4, the latching mechanism 10 is mounted to a trailer T. The trailer can be any type of watercraft trailer which are well known in the art, and may include a tongue 60 for towing purposes, a plurality of wheels 62, a frame 64, guides 66, and guide rollers 68 as desired. In the present embodiment, the latching mechanism 10 is mounted on a post 70 which in turn is mounted to the trailer T. In this embodiment, the post 70 is mounted on the tongue 60 of the trailer T. In accordance with the broad teaching of the present invention, the latching member 12 may be mounted to the trailer T in any manner so long as the receiving channel 14 is positioned to receive the watercraft connection member B. Thus, positioning of the latching mechanism 10 depends on the type and size of watercraft and trailer.

In operation, the trailer T is provided with a frame 64 and wheels 62 for support thereof. The trailer T further includes a post 70 on which the latching mechanism 10 is mounted for receiving the watercraft connection member B and securing the watercraft W on the trailer. When loading a watercraft W, the handle 46 of the latching mechanism 10 is positioned as shown in FIG. 3. This allows the plunger 38 to be biased toward block 34 and latching member 26. Although the block 34 is oppositely biased, the plunger bias is of a greater force.

Figure 5A:
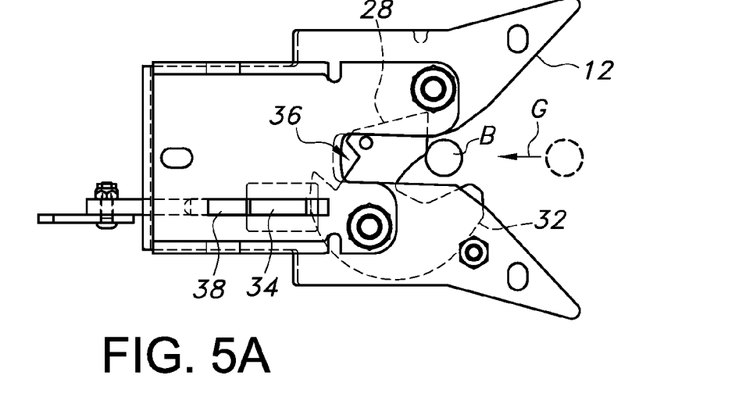
FIG. 5A is a cross-sectional view of the latching mechanism in the receiving position with the watercraft connection member moving toward the latching mechanism.
Figure 5B:
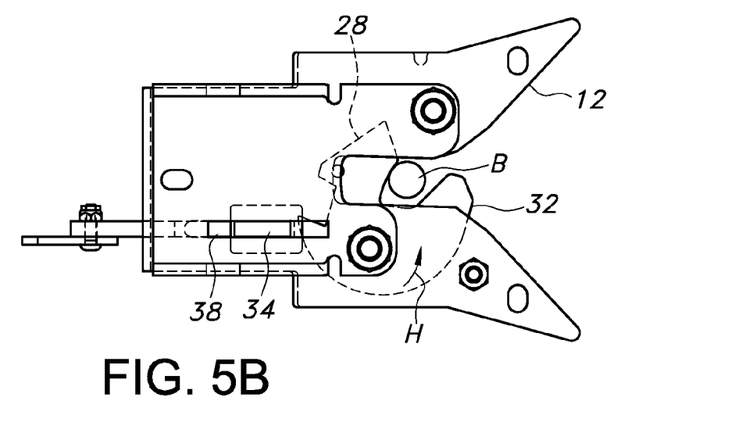
FIG. 5B is a cross-sectional view of the latching mechanism partially rotated through contact with the watercraft connection member between the receiving position and a secured position.
Figure 5C:
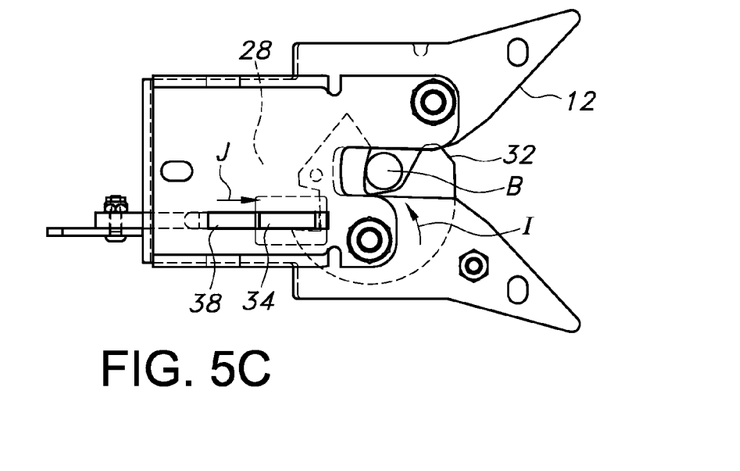
FIG. 5C is a cross-sectional view of the latching mechanism and the watercraft connection member held in the secured position by a block received by a notch in the latching member.

As shown in FIGS. 5A-5C, when the watercraft connection member B enters main body channel 14 (see action arrow G in FIG. 5A) and contacts the leg 28, the force exerted on the leg by the watercraft connection member B is sufficient to overcome the latching member bias and allow the latching member 26 to rotate counterclockwise (see action arrow H in FIG. 5B). The second leg 32 of the latching member 26 rotates across the channel 14 (see action arrow I in FIG. 5C), and blocks the watercraft connection member B from retreating from the channel. This secures the watercraft W in position. In addition, during rotation of the latching member 26, the bias on block 34 forces the block into notch 36 in the latching member (see action arrow J in FIG. 5C). With the block 34 in the notch 36, the latching member 26 is held in the secured position which ensures that the watercraft W is secured on the trailer T.

Figure 6A:
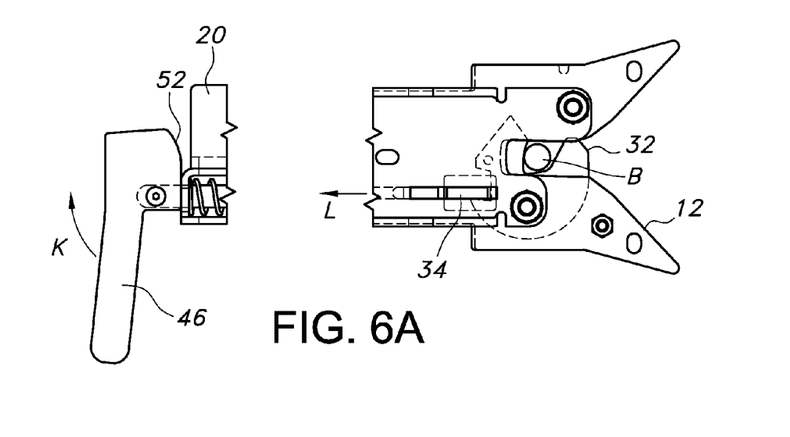
FIG. 6A is a combination of two partial views in order to show a cause and effect from one view to the other including a cross-sectional view of the handle of the latching mechanism rotating from the secured position and a top view of the latching mechanism in the secured position.
Figure 6B:
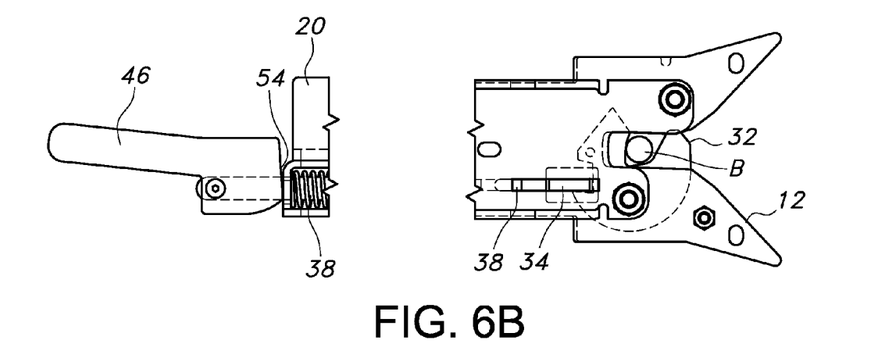
FIG. 6B is a combination of two partial views in order to show a cause and effect from one view to the other including a cross-sectional view of the handle of the latching mechanism in release position wherein the plunger is retracted away from the block and a top view of the latching mechanism held in the secured position by the block.
Figure 6C:
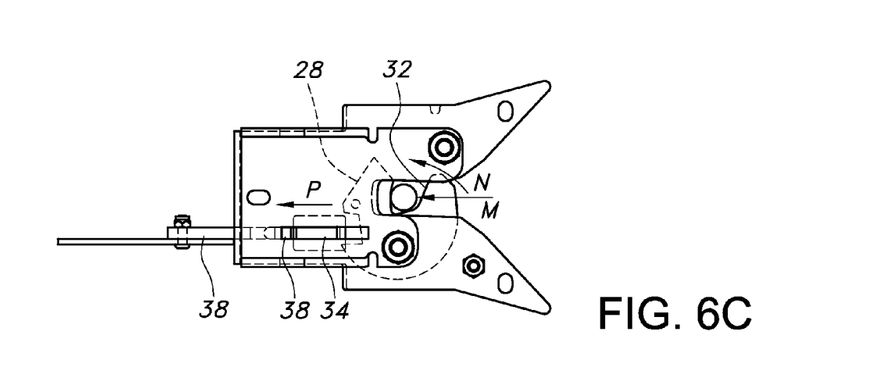
FIG. 6C is a top view of the latching mechanism being contacted by the watercraft connection member thereby rotating the latching mechanism allowing the biased block to be withdrawn from the latching member notch and allowing the latching member to rotate clockwise back to the receiving position.

FIGS. 6A-6C show how to release the watercraft W from the trailer T. When the latching member 26 is held in the secured position and the watercraft W is secured on the trailer T, the handle 46 is in the position shown in FIG. 3. To release the watercraft W from the trailer T, the handle 46 is rotated (see action arrow K in FIG. 6A) along cam surface 52 until the handle comes to rest on side 54. In this position, the plunger 38 is retracted (see action arrow L in FIG. 6A) allowing the block 34 to engage or disengage the latching member 26 dependent upon the latching member being contacted by the watercraft connection member B. As shown in FIG. 6B, although the plunger 38 is retracted for releasing the watercraft W, the block 34 remains in the secure position due to the bias on latching member 26 which secures the block 34 against the wall 44 of the notch 36. In this state, the latching member 26 is in a releasing position.

Further movement of the watercraft connection member B toward the latching member 26 (see action arrow M in FIG. 6C) causes contact with the leg 28 and further rotation of the latching member 26 (see action arrow N in FIG. 6C) which moves notch 36 to a position that allows biased block 34 to be released. At that time, the bias of the block 34 causes the block to recede from the notch 36 (see action arrow P in FIG. 6C) and allows the latching member 26 to rotate clockwise from the secure position to its biased receiving position shown in FIG. 5A. In this manner, the watercraft W can easily be released from the latching mechanism 10 and allowed to float free of the trailer T.

Figure 7:
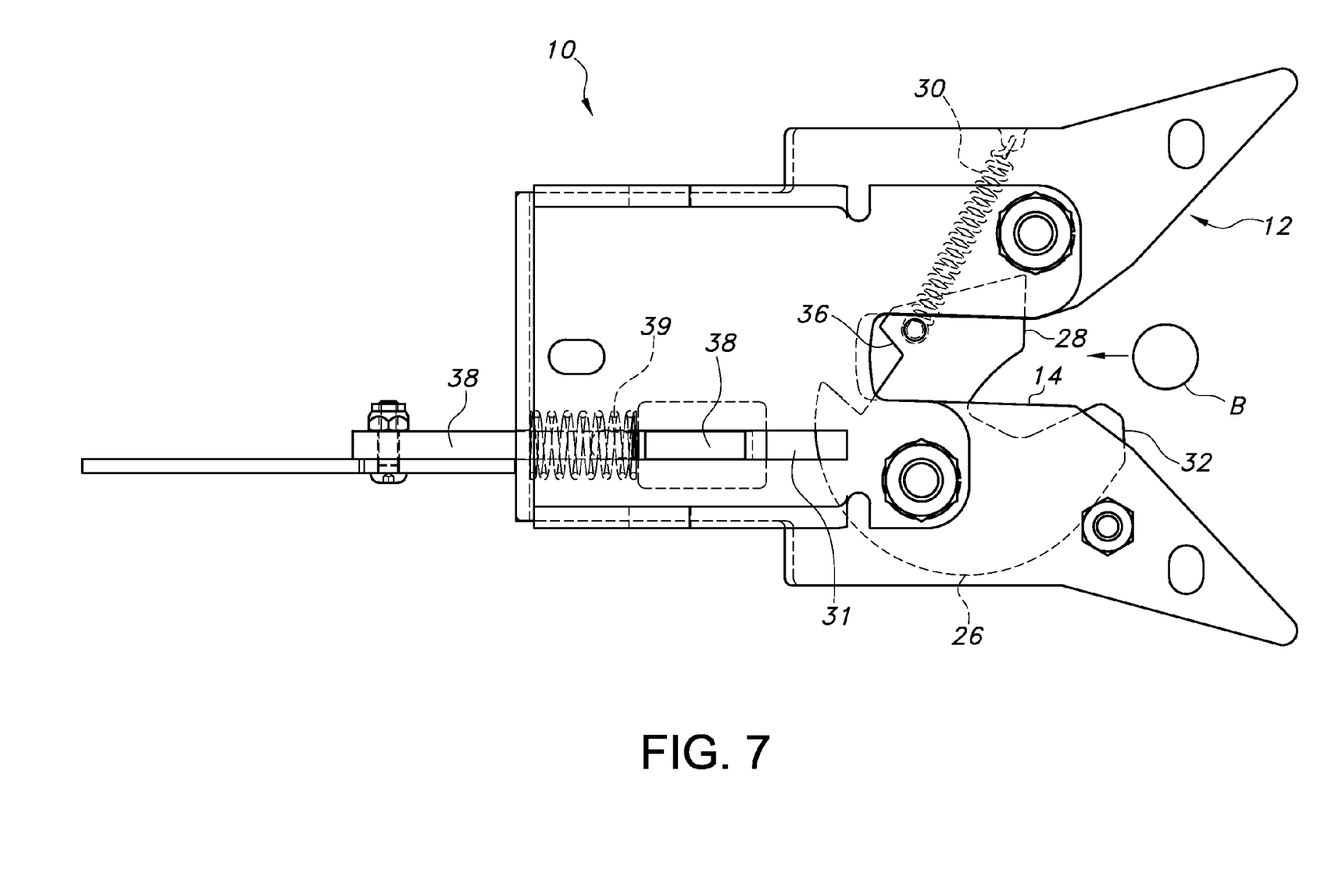
FIG. 7 is a top view of a latching mechanism without a plunger.

In an alternate embodiment of the present invention, the latching mechanism 10 is essentially the same except the block 34 is removed and plunger 38 is longer. With reference to FIG. 7, the latching mechanism 10 includes a main body 12 having a channel 14 for receiving the watercraft connection member B. A latching member 26 is supported by the main body 12 for rotational movement between a receiving position and a secured position. More specifically, the latching member 26 is generally C-shaped and is biased such that a first leg 28 is positioned to engage the watercraft connection member B in the receiving position during loading of the watercraft W. The latching member 26 may be biased using various types of springs, spring arrangements, or the like and, in the preferred embodiment, a spring 30 connected between the latching member 26 and the main body 12 provides the noted bias.

During loading of the watercraft W, the watercraft connection member B enters main body channel 14 and contacts the leg 28. The force exerted on the leg 28 by the watercraft connection member B is sufficient to overcome the bias and allow the latching member 26 to rotate counterclockwise. A second leg 32 of the latching member 26 rotates across the channel 14 and blocks the watercraft connection member B from retreating from the channel. This secures the watercraft W in position.

At some point during rotation of the latching member 26, a plunger 38 is received by a notch 36 in the latching member. This holds the latching member 26 in the secured position. The plunger 38 is retained within a channel 31 of the main body 12 such that the plunger can travel linearly along a path defined by the channel, and into and out of the notch 36 in the latching member 26. The plunger 38 is biased generally toward the latching member 26. The plunger 38 may be biased using various types of springs, spring arrangements, or the like and, in the preferred embodiment, a spring 39 connected between the plunger and the main body 12 provides the noted bias.

Figure 8:
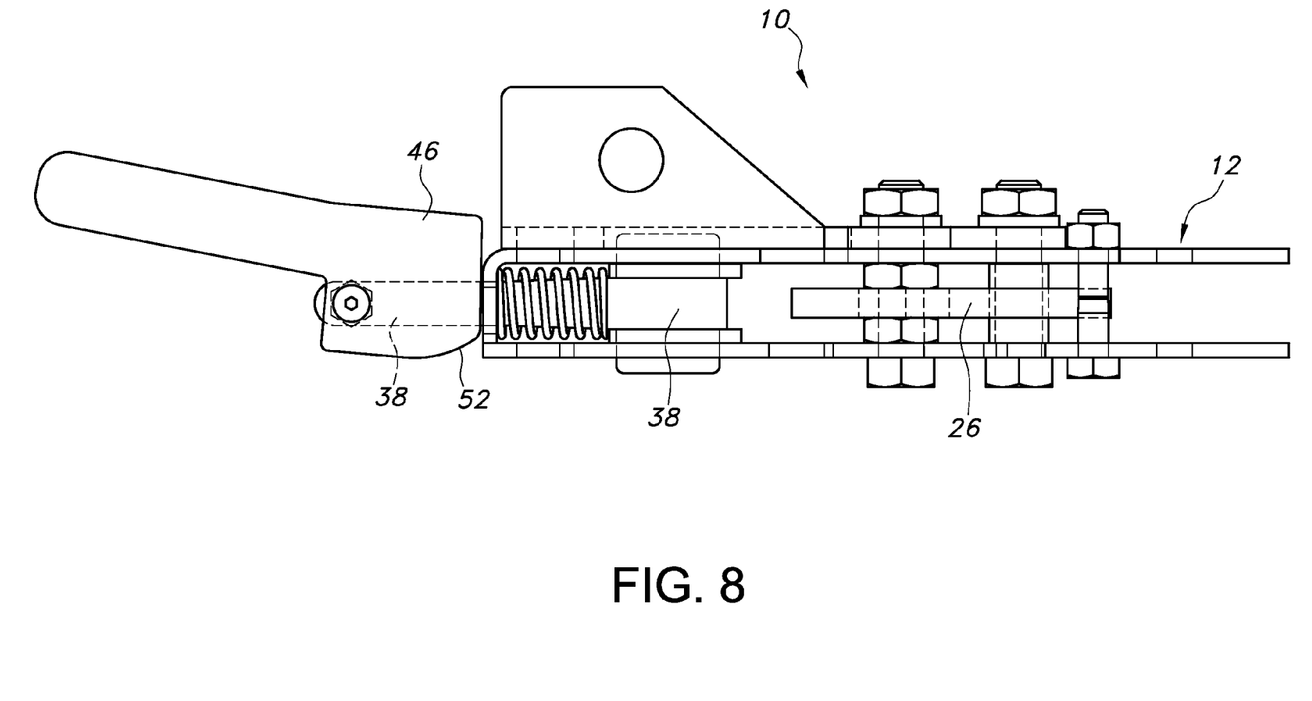
FIG. 8 is a cross-sectional view of the latching mechanism showing the plunger retracted and the latching member in receiving position.

In this manner, when the plunger 38 is retracted by rotation of the handle 46 along cam surface 52 as shown in FIG. 8, the latching member 26 is free to rotate clockwise from the secure position (shown generally in FIG. 5C) back to its biased receiving position (shown generally in FIG. 5A). Depending on the size of the bias force on the latching member 26, the rotational force of the latching member may be insufficient to move the watercraft connection member B out of the channel 14 and the watercraft W remains somewhat secured until the operator moves the watercraft. Once the watercraft W is moved, the bias of the latching member 26 further rotates the latching member to the receiving position.

The foregoing description of the preferred embodiment of the invention has been presented for purposes of illustration and description. It is not intended to be exhaustive or to limit the invention to the precise form disclosed. Obvious modifications or variations are possible in light of the above teachings. For example, different sizes and shapes of latching members and or bias methods can be used to accomplish the teaching of the present invention. Additional mounting holes or the like may also be provided and the dimensions and size of the channel 14 and main body 12, and every other element of the mechanism can also vary as can the materials used in the construction thereof and the manner in which they are attached.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A latching mechanism for use in association with a watercraft trailer for receiving a watercraft connection member in order to secure the watercraft on the trailer comprising:
    a main body having a channel for receiving said watercraft connection member in a receiving position;
    a latching member supported by said main body for rotational movement between the receiving position and a secured position;
    a plunger supported by said main body and biased generally toward said latching member;
    a block biased generally away from said latching member and positioned between said latching member and said plunger for engaging said latching member in the secured position,
    whereby engagement of said latching member by said watercraft connection member causes rotational movement of said latching member which secures the watercraft.

2. The latching mechanism of claim 1, wherein said watercraft connection member is generally U-shaped.

3. The latching mechanism of claim 1, wherein said latching member is biased to the receiving position.

4. The latching mechanism of claim 3, wherein said latching member includes a notch for receiving said block in the secured position.

5. The latching mechanism of claim 4, wherein said block engages at least a wall of said notch in the secured position to prevent rotation of said latching member back to the biased receiving position when the watercraft is secured on the trailer.

6. The latching mechanism of claim 4, wherein said block engages at least a wall of said notch in the secured position to prevent rotation of said latching member back to the biased receiving position when the watercraft is secured on the trailer.

7. The latching mechanism of claim 3, further comprising a handle for retracting said plunger in the secured position thereby allowing said latching member to rotate back to the open position when the watercraft is placed in water.

8. The latching mechanism of claim 7, wherein said handle is rotationally connected to said plunger and acts as a cam when rotated thereby moving said plunger from a first position wherein said plunger engages said block to a second position wherein said plunger is disengaged from said block.

9. A latching mechanism for use in association with a watercraft trailer for receiving a watercraft connection member in order to secure the watercraft on the trailer comprising:
   a main body comprising first and second members, said main body having a first channel for receiving said watercraft connection member in a receiving position;
   a latching member biased to the receiving position and supported by said main body for rotational movement between the receiving position and a secured position;
   a plunger biased in a first direction toward said latching member for securing said latching member in the secured position and linearly extending into a second channel formed by the first and second members of said main body, said second channel comprising a slot in each of the first and second members, wherein the plunger extends into the slot in each of the first and second members in a second direction perpendicular to the first direction,
   whereby engagement of said latching member by said watercraft connection member causes rotational movement of said latching member allowing said plunger to move within said second channel to secure said latching member in the secured position which secures the watercraft.

10. The latching mechanism of claim 9, wherein said latching member includes a notch for receiving said plunger in the secured position.

11. The latching mechanism for use in association with a watercraft trailer for receiving a watercraft connection member in order to secure the watercraft on the trailer of claim 9, further comprising a cover.

12. The latching mechanism of claim 9, further comprising a handle for retracting said plunger in the secured position thereby allowing said latching member to rotate when the watercraft is placed in water.

13. The latching mechanism of claim 12, wherein said handle is rotationally connected to said plunger and acts as a cam when rotated thereby moving said plunger from a first position wherein said plunger extends into said latching member and a second position wherein said plunger is withdrawn from said latching member allowing the bias of said latching member to rotate said latching member from the secured position to the receiving position.

\* \* \* \* \*